United States Patent Office 3,641,000
Patented Feb. 8, 1972

3,641,000
N-SULFONYLCARBOXAMIDE PENICILLINS
John H. Sellstedt, St. Davids, and Scott J. Childress, Philadelphia, Pa., assignors to American Home Products Corporation, New York, N.Y.
No Drawing. Filed June 3, 1969, Ser. No. 830,123
Int. Cl. C07d 99/16
U.S. Cl. 260—239.1
4 Claims

ABSTRACT OF THE DISCLOSURE

This invention concerns N-sulfonylcarboxamide penicillins having potent activity against gram-positive and gram-negative microorganisms.

---

The present invention relates to new and novel synthetic penicillin derivatives. In particular, this invention relates to N-sulfonylcarboxamide penicillins which in standard and accepted biological procedures have demonstrated antibacterial activity.

The new and novel penicillins within the scope of the present invention are exemplified by the following structural formula:

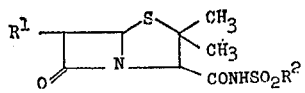

wherein $R^1$ is selected from the group consisting of those having the formulae:

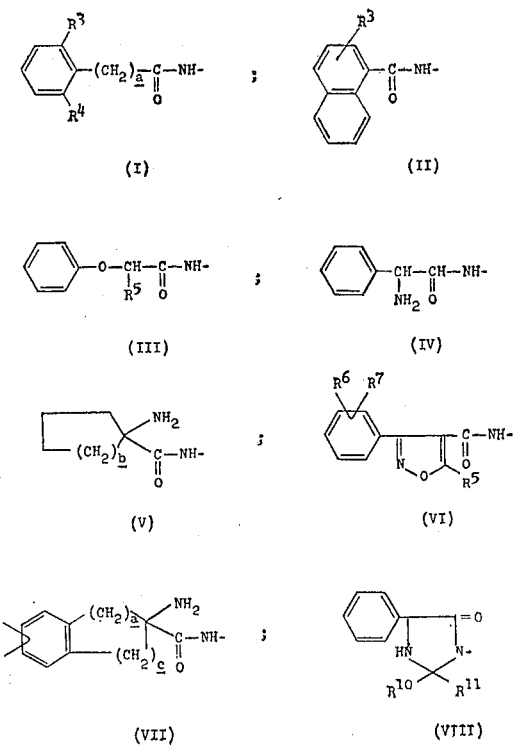

wherein $R^3$ and $R^4$ are selected from the group consisting of hydrogen and lower alkoxy; $R^5$ is selected from the group consisting of hydrogen, lower alkyl and phenyl; $R^6$ and $R^7$ are selected from the group consisting of hydrogen and halogen; $R^8$ and $R^9$ are selected from the group consisting of hydrogen, halogen, lower alkyl, lower alkoxy, phenyl and phenoxy; $R^{10}$ and $R^{11}$ when taken separately are selected from the group consising of hydrogen and lower alkyl, and when taken together with the carbon atom to which they are attached complete a ring selected from the group consisting of cycloalkyl containing from about 4 to about 8 carbon atoms and piperidine; $a$ is an integer from 0 to 1; $b$ is an integer from 0 to 5; $c$ is an integer from 1 to 3, with the provisos that when $a$ is 0, $c$ is greater than 1, and when $a$ is 1, $c$ is less than 3; $R^2$ is selected from the group consisting of lower alkyl, phenyl, lower alkylphenyl, lower alkoxyphenyl, phen(lower) alkyl, pyridyl, furyl, naphthyl, trifluoromethyl, dichloromethyl, di(lower)alkylamino, azolidinyl, perhydroazinyl, perhydroazepinyl and perhydroazocinyl; and the pharmacologically acceptable acid addition salts of those compounds wherein $R^1$ is selected from the groups (IV), (V) and (VII). As employed herein the terms "lower alkyl," "lower alkoxy" and the like are meant to include both branched and straight chain groups having from about one to about six carbon atoms. The term "halogen" as used herein is intended to encompass: chlorine, bromine, iodine and fluorine. Typical examples of the compounds of this invention are:

3,3-dimethyl-N-methylsulfonyl-7-oxo-6-(2-phenoxyacetamido)-4-thia-1-azabicyclo[3.2.0]heptane-2-carboxamide;
N-ethylsulfonyl-3,3-dimethyl-6-(2,2-dimethyl-5-oxo-4-phenylimidazolidin-1-yl)-7-oxo-4-thia-1-azabicyclo [3.2.0]heptane2-carboxamide; and
6-D-(2-amino-2-phenylacetamido)-3,3-dimethyl-N-methyl-sulfonyl-7-oxo-4-thia-1-azabicyclo[3.2.0]heptane-2-carboxamide.

The new and novel penicillins of the present invention may be prepared by the process depicted by the following reaction sequence:

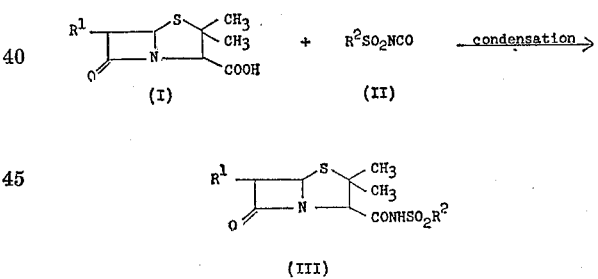

wherein $R^1$ and $R^2$ are defined as above. The condensation reaction is effected by admixing an appropriate penicillin (I) with a sulfonyl isocyanate (II) in an anhydrous reaction-inert solvent containing an acid acceptor for a period of about two hours at ambient temperatures. Preferably this reaction is conducted in anhydrous acetonitrile using triethylamine as the acid acceptor.

When the above reaction is complete, the product is separated by conventional procedures, e.g. concentrated to dryness. Thereafter, the product is dissolved in water, admixed with a water immiscible solvent, acidified to a pH of from about 0.5 to about 3.0 with a mineral acid, e.g. hydrochloric acid and recovered by standard techniques to afford an appropriate N-sulfonylcarboxamide penicillin (III).

The above prepared N-sulfonylcarboxamide penicillins wherein $R^1$ is selected from Formulae IV, V and VII are usually separated as an acid addition salt which is then readily converted to the corresponding base by conventional procedures. Since the compounds of this invention of Formulae IV, V and VII are basic, advantage may be taken of the water solubility of salts of these compounds formed with acids in the isolation and purification of the above compounds and in the preparation of aqueous solutions thereof for oral or parenteral administration. Of course, only salts formed with pharmacologically-acceptable acids should be employed in biological applications. Particularly effective salts are those formed with pharmacologically-acceptable acids having a pK value of 3 or lower. Such acids are well known in the art, for example, hydrochloric, hydrobromic, sulfuric, nitric, phosphoric, benzenesulfonic, toluenesulfonic, methylsulfonic, ethylsulfonic acids and the like. These salts may be prepared by procedures commonly employed in the art, for example, reacting the compound with an equivalent of the selected acid in aqueous solution and concentration of the solution. Other known procedures may also be employed.

The penicillins (I) and the sulfonyl isocyanates (II) employed as starting material in the above-described process are commercially available or are readily prepared by procedures well known in the penicillin art. As employed herein the term "anhydrous reaction-inert solvent" includes any essentially water-free organic solvent which will dissolve the reactants and not interfere with their interaction. For example, acetonitrile, methylene chloride, tetrahydrofuran, dioxane, chloroform, benzene, xylene, toluene, dimethoxyethane, carbon tetrachloride and the like. The term "acid acceptor" is meant to encompass both organic and inorganic compounds capable of taking up protons, e.g. triethylamine, trimethylamine, N-methylmorpholine, pyridine, quinoline, dimethylaniline and the like. Obviously many such "anhydrous reaction-inert solvent" and "acid acceptors" will readily suggest themselves to those skilled in the chemical art. Since many of the starting penicillins of this invention, in particular, the α-amino and 1-aminopenicillins, contain an additional reactive amino group, it is necessary to conduct the above-described reaction with a starting penicillin having a protected amino group, e.g. carbobenzoxy which is removed by hydrogenation when the condensation reaction is complete.

The new and novel N-sulfonylcarboxamide penicillins of the present invention possess valuable biological activity. In particular, in standard and accepted biological tests these compounds have exhibited activity against grampositive and gram-negative bacteria. In this regard, these compounds are, therefore, of value as antibacterial agents, nutritional supplements in animal feed; agents for the treatment of mastitis in cattle; and as therapeutical agents in poultry and mammals, in the treatment of infectious diseases caused by gram-positive and gram-negative bacteria, upon either parenteral or oral administration. Moreover, the compounds have unusually great effectiveness against many of the bacterial strains which have in recent years been found to be highly resistant to many of the previously employed penicillins.

As previously indicated, when the compounds of this invention are employed in mammals, e.g. mice, rats, dogs, monkeys and the like, they may be administered orally or parenterally. Naturally, the dosage of these compounds will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at concentration levels corresponding to those of commercially available penicillins.

The following examples are given by way of illustration:

EXAMPLE I 3,3-dimethyl-7-oxo - 6 - (2-phenoxyacetamido)-4-thia-1-azabicyclo[3.2.0]heptane - 2 - carboxylic acid (8.4 g., 0.024 mole), also known as phenoxymethyl penicillin, is added to anhydrous acetonitrile (20 ml.) and triethylamine (3.35 ml., 0.024 mole) is added, causing the acid to dissolve. This solution is added to a stirred solution of methanesulfonylisocyanate (3.2 g., 0.0264 mole) in acetonitrile (10 ml.) over five minutes. After adding half of the penicillin solution the reaction mixture starts to effervesce and is controlled by cooling in ice. The resulting solution is stirred for two hours at room temperature and the solvent is removed at 30° C. under vacuum, giving an oil which is the triethylamine salt of 3,3-dimethyl-N-methylsulfonyl-7-oxo-6-(2-phenoxyacetamido) - 4 - thia-1-azabicyclo[3.2.0]heptane-2-carboxamide. One-third of the oil is placed under a high vacuum, giving a foam which is dried over $P_2O_5$.

Analysis.—Calcd. for $C_{17}H_{21}N_3O_6S_2 \cdot C_6H_{10}N$ (percent): C, 51.2; H, 6.86; N, 10.6; S, 12.1. Found (percent): C, 51.04; H, 6.72; N, 10.78; S, 12.18.

Another one-third of the oil is dissolved in water (50 ml.) and washed once with ether. Ether (200 ml.) is added to the aqueous layer and the mixture is cooled to 5° C. in ice, stirred, acidified to pH 1 with concentrated hydrochloric acid, and then ethyl acetate is added to dissolve the white gum. The organic layer is washed with water and a saturated salt solution, and then dried with anhydrous sodium sulfate. The solvent is removed at 30° C. under vacuum, causing crystals to form on the sides of the flask. When approximately 15 ml. of solvent remains, the mixture is cooled in ice and the sides of the flask are scratched, giving white crystals of 3,3-dimethyl-N-methylsulfonyl-7-oxo - 6 - (2 - phenoxyacetamido)-4-thia-1-azabicyclo[3.2.0]heptane-2-carboxamide, also described as the N-methylsulfonylcarboxamide of phenoxymethyl penicillin (1.8 g., 50% based on ⅓ of the total yield), M.P. 104° C. dec. (uncorr.).

Analysis.—Calcd. for $C_{17}H_{21}N_3O_6S_2$ (percent): C, 47.76; H, 4.96; N, 9.83; S, 15.00. Found (percent): C, 47.93; H, 4.70; N, 9.66; S, 15.18.

Similarly, the following penicillin derivatives are obtained:

N-phenylsulfonylcarboxamide of phenoxyprop-1-yl penicillin;
N-ethylsulfonylcarboxamide of phenoxyethyl penicillin;
N-(N,N-dimethylaminosulfonyl)carboxamide of α-phenoxybenzyl penicillin;
N-propylsulfonylcarboxamide of α-phenoxyethyl penicillin; and
N-(1-perhydroazinyl)sulfonylcarboxamide of phenoxymethyl penicillin.

EXAMPLE II 6-(2,2 - dimethyl-5-oxo-4-phenylimidazolidin-1-yl)-3,3-dimethyl - 7 - oxo-4-thia-1-azabicyclo[3.2.0]heptane-2-carboxylic acid, also known as phenylimidazolin-1-yl penicillin (0.048 mole) is added to anhydrous acetonitrile (40 ml.) and triethylamine (0.048 mole) is added, causing the acid to dissolve. This solution is added to a stirred solution of ethanesulfonylisocyanate (0.0528 mole) in acetonitrile (20 ml.) over ten minutes. After adding half of the penicillin solution the reaction mixture effervesces which is controlled by cooling in ice. The resulting solution is stirred for two hours at room temperature and the the solvent is removed at 30° C. under vacuum, giving the triethylamine salt of the N-ethylsulfonylcarboxamide of phenylimidazolin-1-yl penicillin which is dissolved in water (300 ml.) and washed once with ether. Ether (1200 ml.) is added to the aqueous layer and the mixture is cooled to 5° C. in ice. Stir and acidify to pH 1 with concentrated hydrochloric acid, and add ethyl acetate. The organic layer is washed with water, and a saturated salt solution then dried with anhydrous sodium sulfate. The solvent is removed at room temperature under vacuum to afford N-ethylsulfonyl-3,3-dimethyl-6-(2,2-dimethyl - 5 - oxo-4-phenylimidazolidin-1-yl)-7-oxo - 4 - thia-1-azabicyclo[3.2.0]heptane-2-carboxamide, also described as the N-ethylsulfonylcarboxamide of phenylimidazolin-1-yl penicillin.

In like manner, the following compounds are prepared:

N-benzylsulfonylcarboxamide of 2,2-dibutyl phenylimidazolidin-1-yl penicillin;
N-trifluoromethylsulfonylcarboxamide of 2,2-cyclobutyl phenylimidazolidin-1-yl penicillin;
N-(2-furylsulfonyl)carboxamide of 2,2-cyclohexyl phenylimidazolidin-1-yl penicillin;
N-methylsulfonylcarboxamide of 2-(4-piperidino) phenylimidazolidin-1-yl penicillin;
N-propylsulfonylcarboxamide of 3,3-bis desmethyl phenylimidazolidin-1-yl penicillin; and
N-(1-perhydrazepinylsulfonyl)carboxamide of phenylimidazolin-1-yl penicillin.

EXAMPLE III 6-(2 - ethoxy - 1 - naphthamido)-3,3-dimethyl-7-oxo-4-thia - 1 - azabicyclo[3.2.0]heptane-2-carboxylic acid (0.02 mole), also known as 2-ethoxynaphthyl penicillin, is added to anhydrous methylene chloride (20 ml.) and trimethylamine (0.02 mole) is added causing the acid to dissolve. This solution is added to a stirred solution of butanesulfonylisocyanate (0.02 mole) in methylene chloride over ten minutes. After adding half the penicillin solution, the reaction mixture starts to effervesce and is controlled by cooling with ice. The reaction mixture is stirred for two hours at room temperature and the solvent is removed under vacuum to afford the trimethylamine salt of the N-butylsulfonylcarboxamide of 2-ethoxynaphthyl penicillin which is dissolved in water (50 ml.) and washed with ethyl acetate. Ethyl acetate (200 ml.) is added to the aqueous layer, the mixture cooled to 5° C. in ice and acidfied to pH 2 with concentrated hydrochloric acid. The organic solution is washed with both water, and a saturated salt solution and then dried with anhydrous sodium sulfate. The solvent is removed under vacuum to yield N - butylsulfonyl-6-(2-ethoxy-1-naphthamido) - 3,3 - dimethyl-7-oxo-4-thia-1-azabicyclo[3.2.0] heptane-2-carboxamide, also described as the N-butylsulfonylcarboxamide of 2-ethoxynaphthyl penicillin.

In a similar manner the following compounds are prepared:

N-dichloromethylsulfonylcarboxamide of naphthyl penicillin;
N-phenethylsulfonylcarboxamide of 2-methoxynaphthyl penicillin;
N-methylsulfonylcarboxamide of 4-butoxynaphthyl penicillin; and
N-(1-azolidinyl)sulfonylcarboxamide of 2-ethoxynaphthyl penicillin.

EXAMPLE IV

Repeating the procedures of Examples I–III, to react appropriate penicillins with sulfonylisocyanates, the compounds listed in the following tables are prepared:

TABLE A

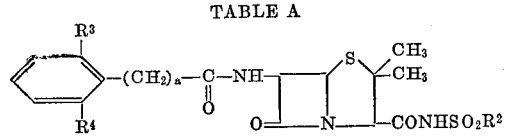

| $R^2$ | $R^3$ | $R^4$ | a |
|---|---|---|---|
| 2-pyridyl | Hydrogen | Hydrogen | 1 |
| N,N-diethylamino | Methoxy | Methoxy | 1 |
| Methyl | Hydrogen | Hydrogen | 0 |
| 2-naphthyl | Ethoxy | Ethoxy | 1 |
| 1-perhydroazocinyl | Butoxy | Butoxy | 1 |

Note.—Wherein $R^2$, $R^3$, $R^4$ and a are defined as above.

TABLE B

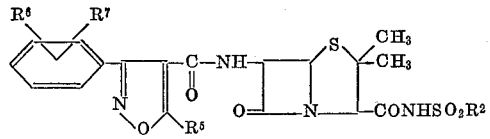

| $R^2$ | $R^5$ | $R^6$ | $R^7$ |
|---|---|---|---|
| Methyl | Methyl | p-Chloro | Hydrogen. |
| Phenyl | Phenyl | Hydrogen | Do. |
| Phenpropyl | Ethyl | o-Bromo | p-Bromo. |
| Ethyl | Hydrogen | m-Iodo | Hydrogen. |
| Butyl | Butyl | p-Chloro | o-Chloro. |
| Methyl | Propyl | p-Fluoro | Hydrogen. |

Note.—Wherein $R^2$, $R^5$, $R^6$ and $R^7$ are defined as above.

EXAMPLE V

6 - D - (2 - carbobenzoxyamino - 2 - phenylacetamido)-3,3 - dimethyl - 7 - oxo - 4 - thia - 1 - azabicyclo[3.2.0] heptane-2-carboxylic acid (0.024 mole) also known as 2-carbobenzoxy ampicillin, is added to anhydrous acetonitrile (20 ml.) and triethylamine (0.024 mole) is added, causing the acid to dissolve. This solution is added to a stirred solution of methanesulfonylisocyanate (0.0264 mole) in acetonitrile (10 ml.) over ten minutes. After adding half of the penicillin solution, the reaction solution starts to effervesce and is controlled by cooling in ice. The resulting solution is stirred for three hours at room temperature and the solvent is removed at 30° C. under vacuum, giving the triethylamine salt of the N-methylsulfonylcarboxamide of 2-carbobenzoxyamino ampicillin which is dissolved in water (50 ml.) and washed once with ether. Ether (200 ml.) is added to the aqueous layer and the mixture is cooled to 5° C. in ice. Stir and acidify to pH 1 with concentrated hydrochloric acid, and add ethyl acetate. The organic portion is washed with water, saturated salt, and dried with anhydrous sodium sulfate. The solvent is removed at 30° C. under vacuum, leaving a residue which is 6-D-(2-carbobenzoxyamino-2-phenylacetamido)-3,3-dimethyl-N-methylsulfonyl-7-oxo - 4 - thia - 1 - azabicyclo[3.2.0]heptane-2-carboxamide, also described as the N-methylsulfonylcarboxamide of 2-carbobenzoxy ampicillin.

The above prepared N-methylsulfonylcarboxamide of 2-carbobenzoxy ampicillin is dissolved in water (100 ml.) by the addition of sodium bicarbonate (2.0 g., 0.024 mole). This solution is added to a mixture of 5% palladium on calcium carbonate (25 g.) suspended in water (100 ml.), that had previously been shaken in an atmosphere of hydrogen at room temperature and atmospheric pressure for one hour. Hydrogenation is continued for one hour. The catalyst is filtered off and washed well with water. The pH is adjusted to 5 with dilute hydrochloric acid, and the solution is concentrated to a small volume at 20° C. under vacuum, giving crystals of the N-methylsulfonylcarboxamide of ampicillin.

When the above process is repeated to react an appropriate 1-carbobenzoxyaminocycloalkane penicillin with a sulfonylisocyanate, the following compounds are afforded:

N-(N-methyl-N-ethylaminosulfonyl)carboxamide of 1-aminocyclopentane penicillin;
N-methylsulfonylcarboxamide of 1-aminocyclohexane pencillin;
N-(N,N-dibutylaminosulfonyl)carboxamide of 1-aminocyclooctane penicillin; and
N-ethylsulfonylcarboxamide of 1-aminocyclononane penicillin.

EXAMPLE VI

When the procedure of Example V is repeated to react appropriate carbobenzoxyamino penicillins with sulfonylisocyanates, the compounds listed in the following table are prepared:

TABLE A

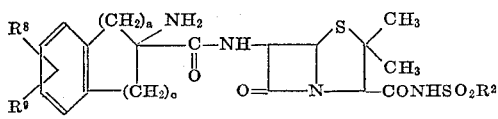

| R² | R⁸ | R⁹ | a | c |
|---|---|---|---|---|
| Methyl | Hydrogen | 5-chloro | 0 | 3 |
| Propyl | do | 3-methyl | 0 | 2 |
| 2-furyl | do | Hydrogen | 1 | 1 |
| Ethyl | 4-bromo | 5-ethyl | 1 | 2 |
| Phenyl | Hydrogen | Hydrogen | 1 | 3 |
| Butyl | 4-phenyl | do | 1 | 1 |
| Benzyl | 4-methoxy | do | 1 | 1 |
| Methyl | Hydrogen | 5-phenoxy | 1 | 1 |
| Ethyl | 4-chloro | 5-chloro | 1 | 1 |
| 2-pyridyl | do | 6-methyl | 1 | 1 |
| Methyl | 4-ethoxy | Hydrogen | 1 | 1 |
| Ethyl | 5-iodo | do | 1 | 1 |

What is claimed is:
1. A compound selected from the group consisting of those having the formula:

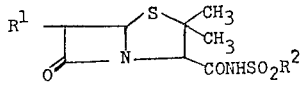

wherein R¹ is selected from the group consisting of those having the formulae:

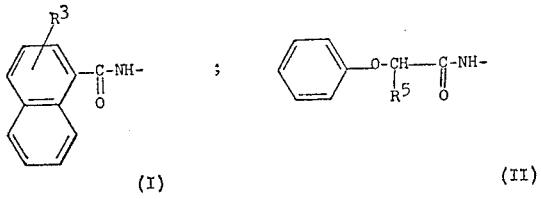

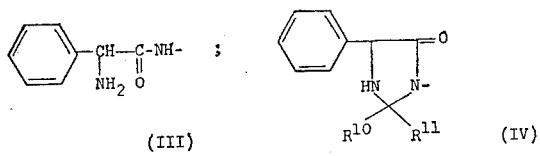

wherein $R^3$ is selected from the group consisting of hydrogen and lower alkoxy; $R^5$ is selected from the group consisting of hydrogen, lower alkyl and phenyl; $R^{10}$ and $R^{11}$ when taken separately are selected from the group consisting of hydrogen and lower alkyl, and when taken together with the carbon atoms to which they are attached complete a ring selected from the group consisting of cycloalkyl containing from about 4 to about 8 carbon atoms and piperidine; $R^2$ is selected from the group consisting of lower alkyl, phenyl, lower alkylphenyl, lower alkoxyphenyl, phen(lower)alkyl, pyridyl, furyl, naphthyl, trifluoromethyl, dichloromethyl, di(lower)alkylamino, azolidinyl, perhydroazinyl, perhydrazepinyl and perhydroazocinyl; and the pharmacologically acceptable acid addition salts of those compounds wherein $R^1$ is selected from group (II).

2. A compound as described in claim 1 which is: 3,3-dimethyl - N - methylsulfonyl - 7 - oxo - 6 - (2 - phenoxyacetamido) - 4 - thia - 1 - azabicyclo[3.2.0]heptane-2-carboxamide.

3. A compound as described in claim 1 which is: N-ethylsulfonyl - 3,3 -dimethyl - 6 - (2,2 - dimethyl - 5 - oxo-4 - phenylimidazolidin - 1 - yl) - 7 - oxo - 4 - thia - 1 - azabicyclo[3.2.0]heptane-2-carboxamide.

4. A compound as described in claim 1 which is: 6-D-(2 - amino - 2 - phenylacetamido) - 3,3 - dimethyl - N-methylsulfonyl - 7 -oxo - 4 - thia - 1 - azabicyclo[3.2.0] heptane-2-carboxamide.

References Cited
UNITED STATES PATENTS 3,169,127  2/1965  Seto _____ 260—239.1
3,177,203  4/1965  Goldberg et al. ____ 260—239.1
3,471,474  10/1969 Ekström et al _____ 260—239.1

NICHOLAS S. RIZZO, Primary Examiner

U.S. Cl. X.R.
424—271

PO-1050
(5/69)

UNITED STATES PATENT OFFICE
CERTIFICATE OF CORRECTION

Patent No. 3,641,000           Dated   February 8, 1972

Inventor(s)   John H. Sellstedt and Scott J. Childress

It is certified that error appears in the above-identified patent and that said Letters Patent are hereby corrected as shown below:

Claim 1,

Column 8, line 16,    "Group II" should read --Group III--

Signed and sealed this 4th day of July 1972.

(SEAL)
Attest:

EDWARD M. FLETCHER, JR.          ROBERT GOTTSCHALK
Attesting Officer                Commissioner of Patents